United States Patent
Lee

(10) Patent No.: US 10,630,966 B2
(45) Date of Patent: Apr. 21, 2020

(54) STEREOSCOPIC CLUSTER FOR VEHICLE, SYSTEM INCLUDING THE CLUSTER, AND METHOD FOR PROVIDING STEREOSCOPIC SCREEN

(71) Applicants: HYUNDAI MOTOR COMPANY, Seoul (KR); KIA MOTORS CORPORATION, Seoul (KR)

(72) Inventor: Ji Soo Lee, Hwaseong-si (KR)

(73) Assignees: HYUNDAI MOTOR COMPANY, Seoul (KR); KIA MOTORS COPORATION, Seoul (KR)

( * ) Notice: Subject to any disclaimer, the term of this patent is extended or adjusted under 35 U.S.C. 154(b) by 0 days.

(21) Appl. No.: 16/151,554

(22) Filed: Oct. 4, 2018

(65) Prior Publication Data

US 2020/0029067 A1    Jan. 23, 2020

(30) Foreign Application Priority Data

Jul. 18, 2018  (KR) ........................ 10-2018-0083424

(51) Int. Cl.
| | | |
|---|---|---|
| *H04N 13/383* | (2018.01) | |
| *B60R 11/04* | (2006.01) | |
| *G06K 9/00* | (2006.01) | |
| *G02B 30/34* | (2020.01) | |

(52) U.S. Cl.
CPC ........... *H04N 13/383* (2018.05); *B60R 11/04* (2013.01); *G02B 30/34* (2020.01); *G06K 9/0061* (2013.01); *G06K 9/00604* (2013.01)

(58) Field of Classification Search
CPC .. H04N 13/383; B60R 11/04; G02B 27/2228; G06K 9/0061
See application file for complete search history.

(56) References Cited

U.S. PATENT DOCUMENTS

| | | | |
|---|---|---|---|
| 5,877,897 A * | 3/1999 | Schofield | B60N 2/002 359/604 |
| 9,342,143 B1 * | 5/2016 | Rhodes | G06F 3/013 |
| 9,756,319 B2 * | 9/2017 | Di Censo | G02B 27/0101 |
| 2007/0234206 A1 * | 10/2007 | Yamabuchi | G09G 5/00 715/210 |
| 2009/0303159 A1 * | 12/2009 | Gustafsson | G02B 27/0093 345/8 |
| 2011/0157167 A1 * | 6/2011 | Bennett | G06F 3/14 345/419 |
| 2014/0225812 A1 * | 8/2014 | Hosoya | G02B 27/017 345/8 |
| 2019/0042834 A1 * | 2/2019 | Gavino | G06K 9/00288 |

* cited by examiner

*Primary Examiner* — Charles V Hicks
(74) *Attorney, Agent, or Firm* — Brinks Gilson & Lione

(57) ABSTRACT

A stereoscopic cluster for a vehicle may include: a processor configured to: detect at least one pair of left and right eyes from acquired image data; distinguish a pair of left and right eyes of a first user among at least two pairs of left and right eyes when the at least two pairs of left and right eyes are detected; and provide a stereoscopic screen based on the distinguished pair of left and right eyes of the first user; and a display controlled by the processor to display the stereoscopic screen.

20 Claims, 9 Drawing Sheets

STEREOSCOPIC CLUSTER FOR VEHICLE, SYSTEM INCLUDING THE CLUSTER, AND METHOD FOR PROVIDING STEREOSCOPIC SCREEN

CROSS-REFERENCE TO RELATED APPLICATION

This application claims priority to and the benefit Korean Patent Application No. 10-2018-0083424, filed on Jul. 18, 2018, in the Korean Intellectual Property Office, the entire contents of which are incorporated herein by reference.

FIELD

The present disclosure relates to a stereoscopic cluster for a vehicle, a system including the cluster, and a method for providing a stereoscopic screen.

BACKGROUND

The statements in this section merely provide background information related to the present disclosure and may not constitute prior art.

Generally, a cluster may be installed on a dashboard of a vehicle and may display gauges such as a driving speed, an engine rotation speed, and a fuel amount, etc. In recent years, a stereoscopic cluster has also been developed that provides a 3D screen.

A conventional stereoscopic cluster for a vehicle may implement a stereoscopic effect by sensing a pair of left and right eyes of a driver using a camera and by using a visual difference between the left and right eyes.

However, we have discovered that the conventional stereoscopic cluster for a vehicle has a following downside: when there are multiple passengers on the vehicle, the camera will detect all of pairs of left and right eyes of the passengers, and, thus, the cluster will provide a stereoscopic screen for the multiple pairs of left and right eyes. As a result, a sharpness of the stereoscopic screen may be lowered, and the driver may not be provided with a clear stereoscopic screen.

SUMMARY

The present disclosure addresses the above-mentioned problems occurring in the prior art while advantages achieved by the prior art are maintained intact.

An aspect of the present disclosure provides a stereoscopic cluster for a vehicle, a system including the cluster and a method for providing a stereoscopic screen by which, in detection of multiple pairs of left and right eyes, a pair of left and right eyes of an actual driver may be distinguished between the multiple pairs of left and right eyes to provide a clear stereoscopic screen.

The technical problems to be solved by the present inventive concept are not limited to the aforementioned problems, and any other technical problems not mentioned herein will be clearly understood from the following description by those skilled in the art to which the present disclosure pertains.

According to one aspect of the present disclosure, a stereoscopic cluster for a vehicle includes: a processor which detects at least one pair of left and right eyes from acquired image data, distinguishes a pair of left and right eyes of a first user among at least two pairs of left and right eyes when the at least two pairs of left and right eyes are detected, and provides a stereoscopic screen based on the distinguished pair of left and right eyes of the first user, and a display which is controlled by the processor to display the stereoscopic screen.

In one form of the cluster, the processor may determine presence or absence of a second user other than the first user in the vehicle, and when the second user other than the first user is present, may distinguish the pair of left and right eyes of the first user among the at least two pairs of left and right eyes.

In another form of the cluster, the processor may determine, based on a received sensed value from an ultrasonic sensor for sensing movement within the vehicle, or from a mat sensor for sensing whether a corresponding seat is seated, whether the second user other than the first user is present in the vehicle.

In one form of the cluster, when the at least two pairs of left and right eyes are detected and the second user other than the first user is present, the processor may distinguish the pair of left and right eyes of the first user based on a dimension of each of the at least two pairs of left and right eyes, and based on a distance between each of the at least two pairs of left and right eyes and the stereoscopic cluster.

In another form of the cluster, when the at least two pairs of left and right eyes are detected and the second user other than the first user is absent, the processor may determine whether current time is nighttime.

In other form of the cluster, when the at least two pairs of left and right eyes are detected, the second user other than the first user is absent, and the current time is the nighttime, the processor may distinguish the pair of left and right eyes of the first user based on a dimension of each of the at least two pairs of left and right eyes, and based on a distance between each of the at least two pairs of left and right eyes and the stereoscopic cluster.

In an exemplary form of the cluster, when the at least two pairs of left and right eyes are detected, the second user is absent in the vehicle, and the current time is daytime, the processor may determine a current state as an abnormal state.

In another exemplary form of the cluster, when it is determined that the current state is the abnormal state, the processor may control the display to provide a two-dimensional (2D) screen thereon.

In one form of the cluster, when the abnormal state returns to a normal state while the 2D screen is being presented, the processor may provide a pop-up on the display such that the first user selects whether to change the current 2D screen to the stereoscopic screen.

In another form of the cluster, the processor may determine, based on information received from an auto-light sensor and/or information received from a navigation device, whether the current time is nighttime.

In other form of the cluster, the processor may detect a face zone of the first user, detect features in the detected face zone, and track coordinates of left-right eyes among the features.

In an exemplary form of the cluster, the display may include an image panel including a right-eye image pixel for providing a right image for a right-eye, and a left-eye image pixel for providing a left image for a left-eye, and a barrier disposed on a front face of the image panel, wherein the barrier is controlled by the processor.

In another exemplary form of the cluster, the processor may control the barrier based on a position of the pair of left and right eyes of the first user.

According to another aspect of the present disclosure, a system may include a passenger detection device which detects presence or absence of a passenger in a vehicle, and a stereoscopic cluster for the vehicle, wherein the cluster detects at least one pair of left and right eyes from acquired image data, distinguishes a pair of left and right eyes of a first user among at least two pairs of left and right eyes when the at least two pairs of left and right eyes are detected, and provides a stereoscopic screen based on the distinguished pair of left and right eyes of the first user.

According to still another aspect of the present disclosure, a method for providing a stereoscopic screen may include: detecting, by a processor, at least one pair of left and right eyes from acquired image data; when at least two pairs of left and right eyes are detected, distinguishing, by the processor, a pair of left and right eyes of a first user among the at least two pairs of left and right eyes; and providing, by the processor, a stereoscopic screen based on the distinguished pair of left and right eyes.

In one form of the method, the distinguishing the pair of left and right eyes of the first user may include, when a number of the detected pairs of left and right eyes in the vehicle is at least two, determining presence or absence of a second user other than the first user in the vehicle, and when the second user other than the first user is present, distinguishing the pair of left and right eyes of the first user based on a dimension of each of the at least two pairs of left and right eyes, and based on a distance between each of the at least two pairs of left and right eyes and a stereoscopic cluster.

In another form of the method, the distinguishing the pair of left and right eyes of the first user may further include, when the number of the detected pairs of left and right eyes in the vehicle is at least two and the second user other than the first user is absent in the vehicle, determining whether current time is nighttime; and when it is determined that the current time is the nighttime, distinguishing the pair of left and right eyes of the first user based on the dimension of each of the at least two pairs of left and right eyes, and based on the distance between each of the at least two pairs of left and right eyes and the stereoscopic cluster.

In other form of the method, the distinguishing the pair of left and right eyes of the first user may include, when the current time is daytime, determining a current state as an abnormal state, and providing a two-dimensional (2D) screen for the first user.

In an exemplary form of the method, the method may further include, continuously determining, by the processor, whether the second user is present and determining the current time while the 2D screen is being presented, and when it is determined, based on the determination result, that the abnormal state returns to a normal state, providing a pop-up for changing the 2D screen to a stereoscopic screen.

In another exemplary form of the method, the determining the presence or absence of the second user may include, determining whether the second user other than the first user is present in the vehicle based on a received sensed value from an ultrasonic sensor for sensing movement within the vehicle, or from a mat sensor for sensing whether a corresponding seat is seated.

In other form of the method, the providing the stereoscopic screen may include controlling a barrier based on a position of the pair of left and right eyes of the first user.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
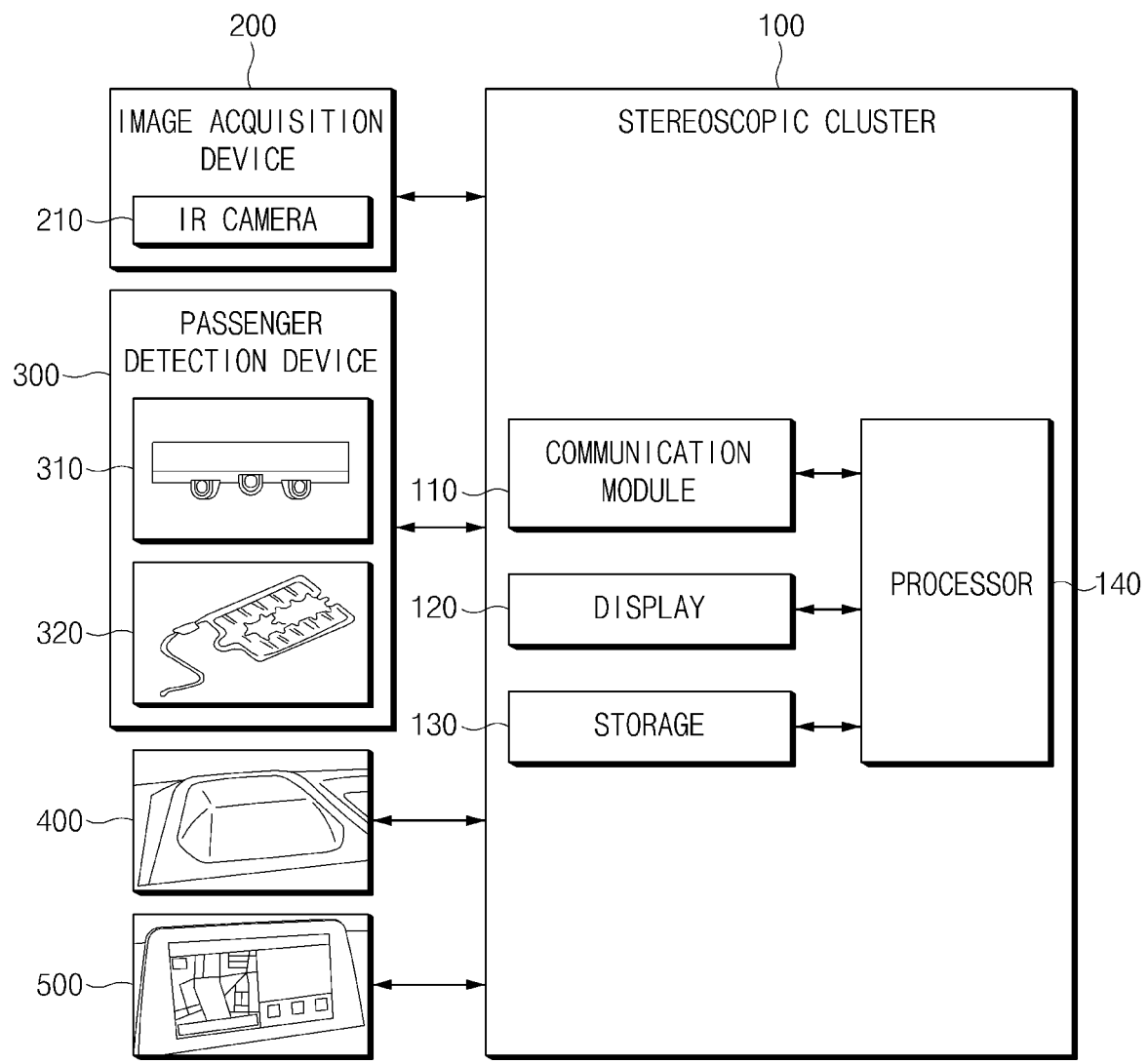
FIG. 1 is a block diagram of a configuration of a stereoscopic cluster system for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In adding reference denotations to elements of each drawing, although the same elements are displayed on a different drawing, it should be noted that the same elements have the same denotations. In addition, in describing one form of the present disclosure, if it is determined that a detailed description of related well-known configurations or functions blurs the gist of one form of the present disclosure, it will be omitted.

In describing elements of forms of the present disclosure, the terms 1st, 2nd, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In accordance with the present disclosure, when a passenger-in-vehicle detection system, and an auto-light sensor detect multiple pairs of left and right eyes in the vehicle, a pair of left and right eyes of a first user, that is, a driver may be distinguished between the multiple pairs of left and right eyes. Thus, a barrier may be controlled based on the distinguished pair of left and right eyes of the first user to provide the first user with a clear stereoscopic screen. Further, a stereoscopic screen may be adapted to an abnormal state.

Hereinafter, with reference to FIGS. 1 to 9, forms of the present disclosure will be specifically described.

Figure 2:
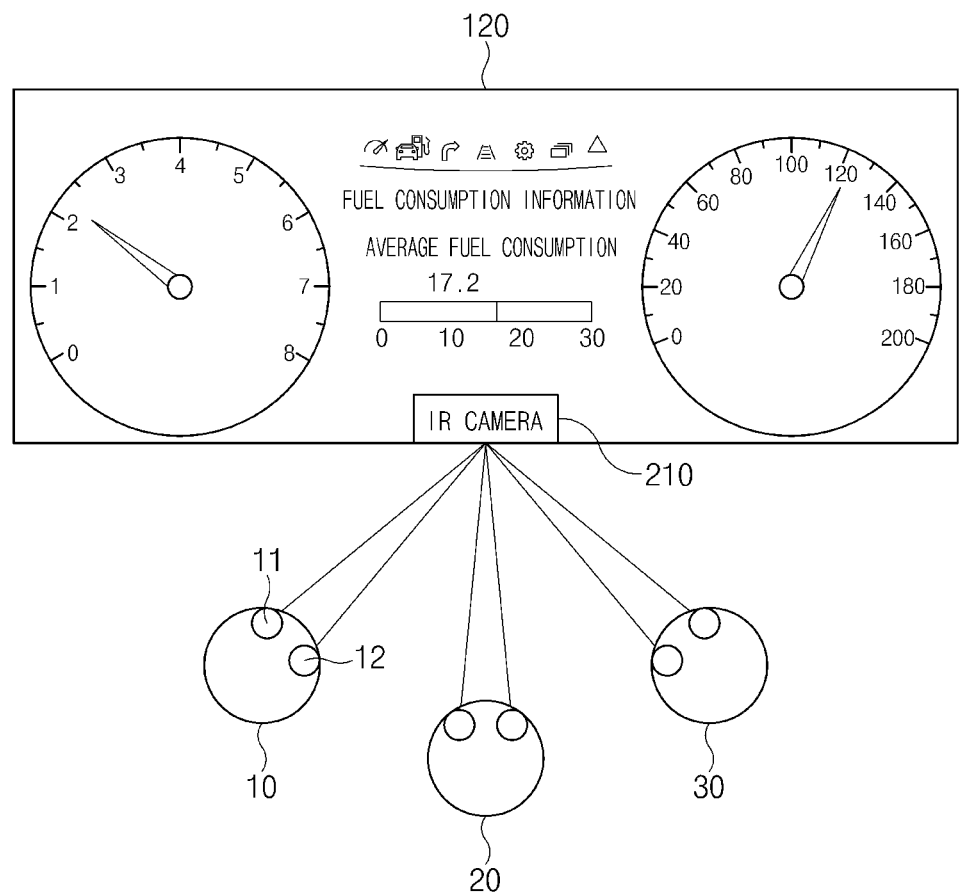
FIG. 2 is a front exemplary view of a stereoscopic cluster for a vehicle.

FIG. 1 is a block diagram of a configuration of a stereoscopic cluster system for a vehicle. FIG. 2 is a front exemplary view of a stereoscopic cluster for a vehicle.

The stereoscopic cluster system for a vehicle may include a stereoscopic cluster 100 for a vehicle, an image acquisition device 200, a passenger detection device 300, an auto-light sensor 400, and a navigation device 500.

The stereoscopic cluster 100 for a vehicle may enhance the driver's perception by displaying various information and alerts on a stereoscopic screen via applying a liquid crystal display (LCD)-based 3D stereoscopic technique to a vehicle cluster. The stereoscopic cluster 100 for a vehicle may include a communication module 110, a display 120, storage 130, and a processor 140.

The communication module 110 may communicate with various devices within the vehicle such as the image acquisition device 200, the passenger detection device 300, the auto-light sensor 400, the navigation device 500, etc. Such communication may be based on vehicle communication such as controller area network (CAN) communication, and the like.

The display 120 may display a 2D screen (a flat screen), or a 3D screen (a stereoscopic screen). A specific structure of the display 120 will be illustrated with reference to FIG. 3 below. The display 120 may include at least one or more of a liquid crystal display (LCD), a light emitting diode display (LED), an organic light emitting diode display (OLED), a plasma image display device (PDP), and an electroluminescent display (EL). Referring to FIG. 2, the display 120 may display vehicle drive-related information such as vehicle fuel consumption, speed, RPM, average fuel consumption as well as information about surroundings adjacent to the vehicle.

The storage 130 may store information produced from the processor 140, and information received from the image acquisition device 200, the passenger detection device 300, the auto-light sensor 400, the navigation device 500, and the like. The storage 130 may include a storage medium such as at least one or more of a flash type memory, a hard disk type memory, a micro type memory, a card type memory (for example, an SD (Secure Digital) card, or an XD (eXtream Digital) card), RAM (random access memory), SRAM (static RAM), ROM (read-only memory), PROM (programmable ROM), EEPROM (Electrically Erasable PROM), MRAM (magnetic), a magnetic disk type memory, and an optical disc type memory.

The processor 140 may detect at least one or more pairs of left and right eyes of passengers in the vehicle, to distinguish a pair of left and right eyes of the first user (driver) among the at least one or more pairs of left and right eyes, and to provide a stereoscopic screen based on the distinguished pair of left and right eyes of the first user. The processor 140 may be configured to determine positions of a face and eyes of the first user as received from an infra-red (IR) camera 210 and to control a barrier based on the determined positions of the face and eyes of the first user.

The processor 140 performing the functions as described above may be implemented with an electrical circuit that executes instructions in software. Further, the processor may perform various functions illustrated below. The processor 140 may be implemented using an air-bag control unit (ACU) for a vehicle, an integrated body unit (IBU) for a vehicle, or the like.

To this end, the processor 140 may acquire the coordinates of the left and right eyes from image data acquired from the image acquisition device 200. That is, the processor 140 may detect a face zone of the first user from the image data received from the image acquisition device 200, and detect features in the detected face zone. In this connection, a landmark or feature may include eyes, nose, mouth, ears, etc. The processor 140 may track coordinates (X, Y) of left and right eyes among the landmarks or features.

When a single left and right-eye pair is detected from the image data, the processor 140 may determine that the pair of left and right eyes is the pair of left and right eyes of the first user (driver). Thus, a barrier in the display 120 may be controlled based on a distance between the pair of left and right eyes of the first user and the stereoscopic cluster 100 for a vehicle, or the IR camera 210 to provide a stereoscopic screen. In this connection, the barrier for implementing the stereoscopic screen may be controlled differently based on the distance between the pair of left and right eyes of the first user and the IR camera 210 or the stereoscopic cluster 100 for a vehicle or the like.

Figure 3:
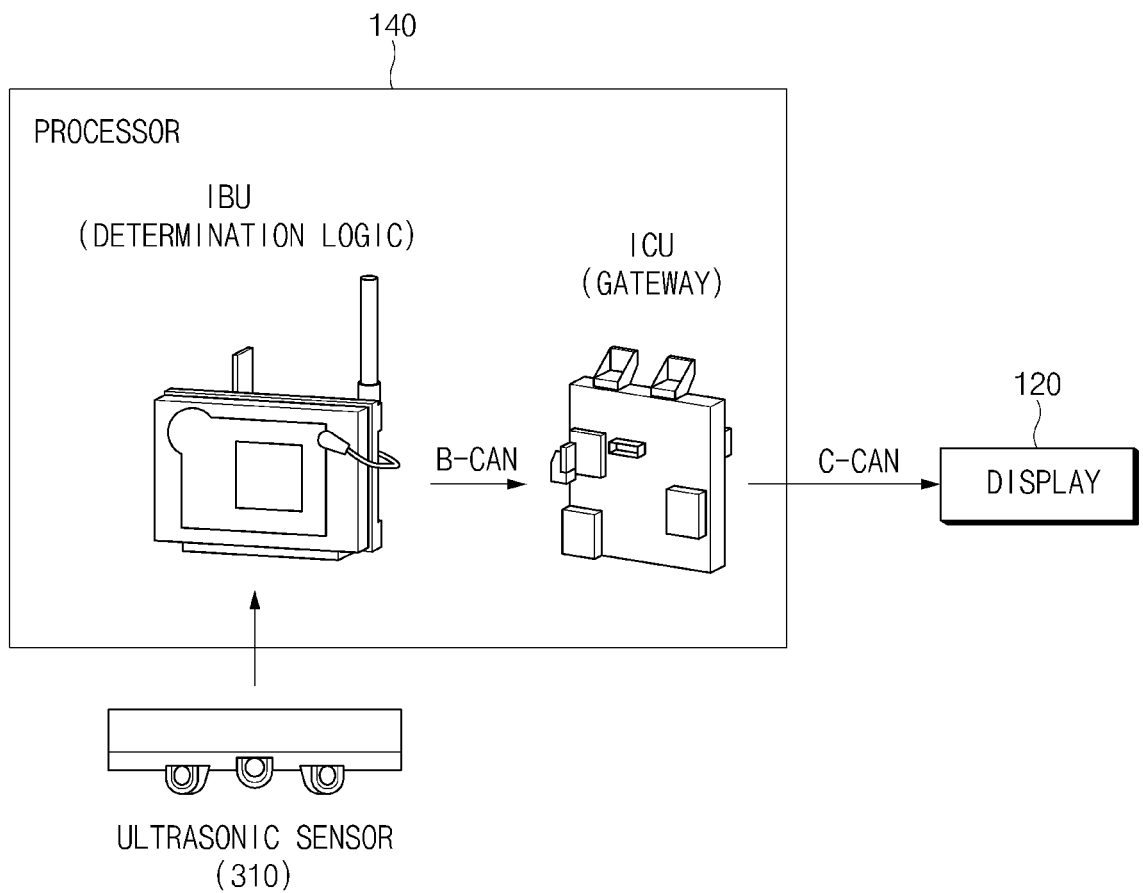
FIG. 3 is an illustration about how a stereoscopic cluster for a vehicle determines presence or absence of a passenger in a vehicle.

Further, when multiple pairs of left and right eyes are detected from the image data, the processor 140 may use detection results from an ultrasonic sensor 310 and a mat sensor 320 to determine whether there is a passenger other than the first user. That is, the processor 140 may determine a movement of an object in the vehicle via the ultrasonic sensor 310 and may determine a seated or unseated state of the passenger via the mat sensor 320. Further, the processor 140 may determine presence or absence of the passenger using signals from a front driver door switch (not shown), a rear passenger door switch (not shown), and the like. FIG. 3 is an illustration of an operation to determine absence or presence of a passenger by the stereoscopic cluster for a vehicle. Referring to FIG. 3, the ultrasonic sensor 310 may transmit the result of motion detection in the vehicle to the IBU. Then, the IBU may use the detection result from the ultrasonic sensor 310 to determine absence or presence of a passenger other than the first user. The IBU may then use the ICU to provide a stereoscopic screen to the display 120.

Figure 4:
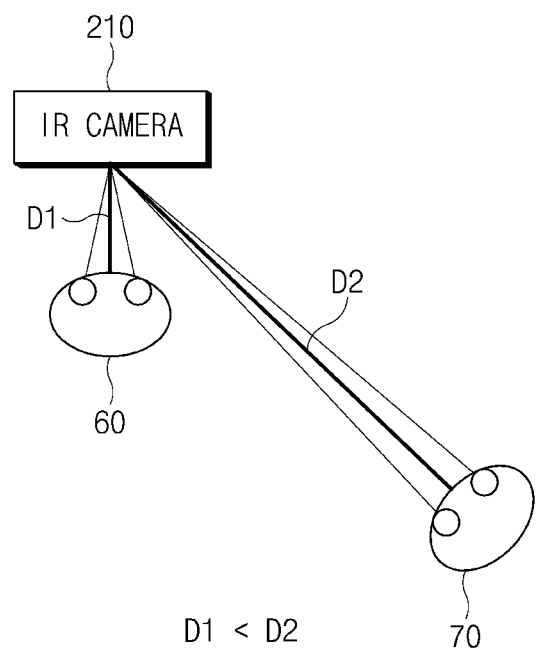
FIG. 4 is an illustration of a method for distinguishing a pair of left and right eyes of a first user between multiple pairs of left and right eyes by a stereoscopic cluster for a vehicle.

When multiple pairs of left and right eyes are detected and there is a passenger other than the first user, the processor 140 may calculate a dimension of each of the pairs of left and right eyes and a distance between each of the multiple pairs of left and right eyes and the IR camera 210 mounted on the stereoscopic cluster 100 or the stereoscopic cluster 100 for a vehicle. Then, the processor may distinguish a pair of left and right eyes of the first user (driver) between the multiple pairs of left and right eyes based on the calculated dimension and/or distance. In this connection, the dimension of the pair of left and right eyes may be a dimension of a contour of the pair of left and right eyes and/or a distance between center points of the left and right eyes. That is, the pair of left and right eyes of the first user located on the driver seat may be closer to the stereoscopic cluster 100 than the pair of left and right eyes of the passenger located on the front passenger seat or rear passenger seat. Thus, the dimension of the pair of left and right eyes of the first user located on the driver seat may be greater than the dimension of the pair of left and right eyes of the passenger located on the front passenger seat or rear passenger seat. Thus, the processor 140 may distinguish, as the pair of left and right eyes of the first user, the pair of left and right eyes with the greatest distance between the center points of the left and right eyes and/or the greatest contour dimension of the left and right-eye pair. Further, the processor 140 may distinguish the pair of left and right eyes having the closest distance to the stereoscopic cluster 100 as the pair of left and right eyes of the first user. The processor 140 may control the barrier in the display 120 based on position information of the pair of left and right eyes of the first user to provide a stereoscopic screen. FIG. 4 is a diagram illustrating a method for distinguishing the pair of left and right eyes of the first user between multiple pairs of left and right eyes by the stereoscopic cluster. Referring to FIG. 4, when a distance D1 between a first user 60 and the IR camera 210 and a distance D2 between a second user 70 as a passenger on the rear passenger seat and the IR camera 210 are compared with each other, the distance D1 may be smaller than the distance D2. That is, the pair of left and right eyes having the shortest distance from the IR camera 210 may correspond to the pair of left and right eyes of the first user, i.e., the driver.

In one form, when multiple pairs of left and right eyes are detected but no other passenger is present, the processor 140 may determine, based on information received from the auto-light sensor 400 or temporal information received from the navigation device 500, whether a current time is a nighttime or daytime. Alternatively, the processor 140 may determine, based on a combination of the information received from the auto-light sensor 400 and the temporal information received from the navigation device 500, whether a current time is a nighttime or daytime.

Further, the processor 140 may compare an illumination level outside the vehicle received from the auto-light sensor 400 with a predetermined threshold level. When the outside illuminance level is lower than the predetermined threshold level, the processor may determine that the current time is nighttime. Alternatively, when the processor 140 receives light turn-on signal from the auto-light sensor 400, the processor 140 may determine that the current time is nighttime.

A face of the first user may be reflected on a window by an indoor light or the IR camera 210 may detect a face zone of the face reflected on the window. In this case, despite having only the first user in the vehicle, a false pair of left and right eyes may be detected on the window or IR camera 210, which allows multiple pairs of left and right eyes to be falsely detected. This phenomenon may frequently occur especially when a current time is nighttime. Thus, when the multiple pairs of left and right eyes are detected, there is no passenger other than the first user, and current time is nighttime, the processor 140 may determine some of the left and right eyes pairs as false left and right eyes pairs and thus, may distinguish only a true pair of left and right eyes of the first user. The processor 140 may use a position of an image photographed from the IR camera 210 to distinguish between false left and right eyes pairs visible on a window at nighttime and the true pair of left and right eyes of the first user. Additionally or alternatively, the processor 140 may use any of a variety of conventional techniques that may distinguish between the true pair of left and right eyes of the first user and the false multiple pairs of left and right eyes reflected onto windows or cameras.

To the contrary, when determined that multiple pairs of left and right eyes are detected, no passenger other than the first user is present, and the current time is daytime, the processor 140 may determine that a current state is an abnormal state and may provide a 2D screen. This is because when no passenger other than the first user is present, and the current time is daytime, the multiple pairs of left and right eyes cannot be normally detected.

In this way, the processor 140 may determine the current state to be the abnormal state and may provide a 2D screen rather than a stereoscopic screen. Meantime, the processor may continue to monitor left and right-eye pair detection, presence or absence of a passenger other than the driver or the first user, current time change, etc. When it is determined based on the monitoring result that the current state goes out of the abnormal state, that is, the current state returns to the normal state, the processor may display a pop-up screen to provide a stereoscopic screen, allowing the first user to choose to switch from a current 2D screen to a stereoscopic screen. In this connection, the normal state may include a case in which multiple pairs of left and right eyes are detected and the second user is present in addition to the first user, and a case in which multiple pairs of left and right eyes are detected, the second user does not exist in the vehicle in addition to the first user, and the current time is nighttime. For example, when multiple pairs of left and right eyes are detected, only the first user exists in the vehicle, and the current time is daytime, this state may be determined as an abnormal state. After a certain period of time, multiple pairs of left and right eyes may be detected again when only the first user exists in the vehicle and the current time is changed to nighttime. This may mean that the current state has returned to the normal state.

Figure 5:
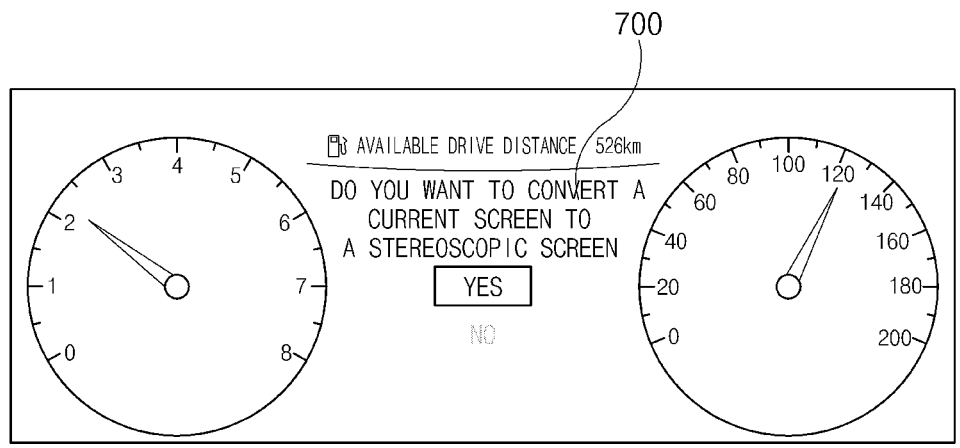
FIG. 5 is an exemplary view of a display that encourages conversion of a 2D screen to a stereoscopic or 3D screen during the 2D screen display on a stereoscopic cluster for a vehicle.

FIG. 5 is an exemplary view of a screen 700 that encourages conversion of a 2D screen to a stereoscopic or 3D screen during the 2D screen display on a stereoscopic cluster for a vehicle. Referring to FIG. 5, a suggestion popup "Do you want to convert a current screen to a stereoscopic screen" and a "Yes" or "No" button may be displayed on a central area of the display 120. When the first user desires to switch to the stereoscopic screen, the first user may touch the "Yes" button.

The image acquisition device 200 may capture the face of the driver (i.e., the first user) seated in the driver seat of the vehicle, and the face of the passenger seated in the passenger seat and the rear seat, and may provide image data to the stereoscopic cluster 100. To this end, the image acquisition device 200 may include the IR camera 210. Referring to FIG. 2, the IR camera 210 may be mounted on a middle portion of a bottom of the stereoscopic cluster 100. The IR camera 210 may also capture the faces of users 10, 20 and 30 facing the stereoscopic cluster 100.

The passenger detection device 300 may detect presence or absence of a passenger on a front passenger seat or a rear passenger seat other than the driver seat and may provide the detection result to the stereoscopic cluster 100. For this purpose, the passenger detection device 300 may include the ultrasonic sensor 310 and the mat sensor 320. The ultrasonic sensor 310 may sense movement of an object in the vehicle. The mat sensor 320 may be mounted in a front passenger seat or a rear passenger seat and may detect whether a passenger is seated on the seat and whether a person or an object is placed on the seat. In this connection, the mat sensor 320 may be classified into a weight-sensing type sensor and a dielectric type sensor. The weight-sensing type mat sensor 320 may determine whether a person or an object over 30 kg is seated on the corresponding mat. The dielectric type mat sensor 320 may detect, based on an electric conductivity, whether a person is seated on the seat, and/or whether a person or object is disposed on the corresponding seat. Although only one ultrasonic sensor 310 and one mat sensor 320 are shown in FIG. 1, the present disclosure is not limited thereto. A plurality of ultrasonic sensors 310, and a plurality of mat sensors 320 may be provided. Alternatively or in addition to the ultrasonic sensor and the mat sensor, various sensors may be provided which include an infrared sensor, an optical sensor, a contact sensor, etc. to sense the passenger.

The auto-light sensor 400 may measure an illuminance level outside the vehicle and provide the measured level to the stereoscopic cluster 100. The auto-light sensor 400 may be configured to sense the brightness of the light (illuminance). The auto-light sensor 400 may convert an optical signal into an electrical signal and transmit the converted signal to the processor 140. The auto-light sensor 400 may be configured to output an electrical signal (voltage) proportional to external brightness using a photoelectric conversion device such as a photodiode or the like.

The navigation device 500 may feed temporal information to the stereoscopic cluster 100, and may include a vehicle's AVN (audio, video, navigation) functionality.

As described above, the stereoscopic cluster 100 according to the present disclosure may distinguish only the pair of left and right eyes of the first user (driver) even when multiple pairs of left and right eyes are detected, and, thus, may control the barrier based on the distinguished pair, thereby providing a clear stereoscopic screen to the first user.

Figure 6:
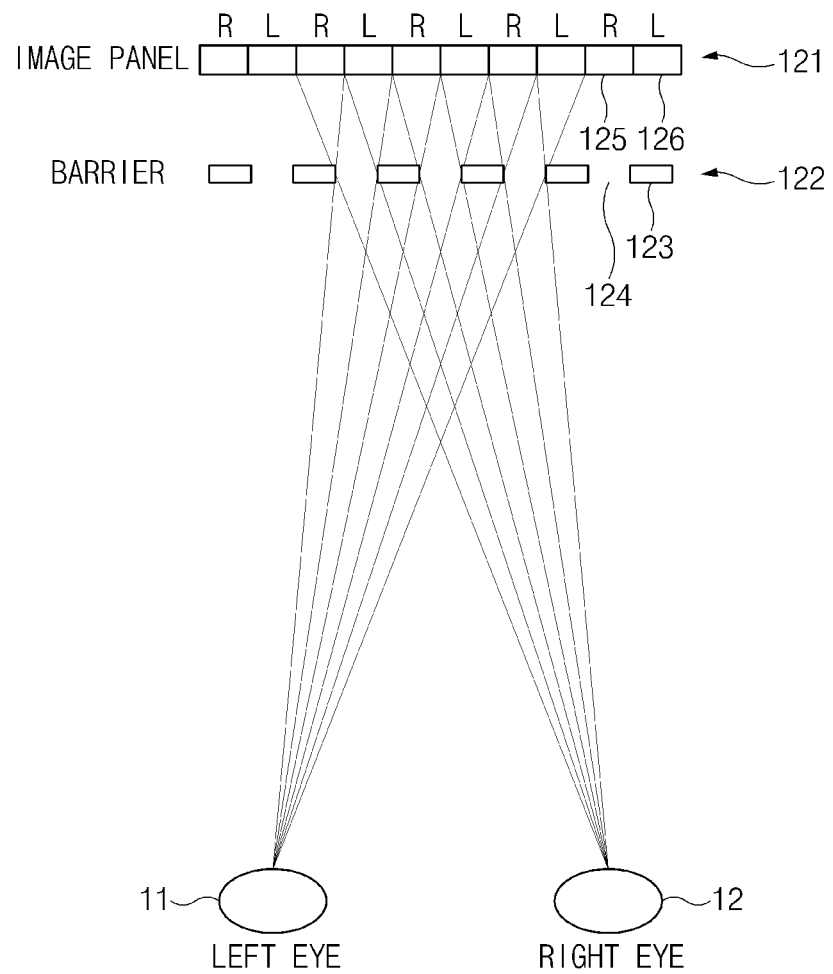
FIG. 6 is an illustration of a structure of a stereoscopic cluster using a barrier control scheme.

FIG. 6 is a diagram illustrating a structure of a stereoscopic cluster using a barrier control scheme.

Referring to FIG. 6, the display 120 of FIG. 1 may include an image panel 121 and a barrier 122. The display 120 may include the image panel (e.g., a liquid crystal display (LCD) panel) 121 and the barrier 122 disposed on the image panel. In this connection, the LCD acts as a screen to output a captured image. The barrier may be embodied as a liquid crystal to control a stereoscopic feeling in a 3D image by masking one image among corresponding left-right images such that the left-rights eyes of the user may view different images.

The image panel 121 may include a right-eye image pixel 125 for providing an image to the right-eye 12 and a left-eye image pixel 126 for providing an image to the left-eye 11. The image panel 121 may be implemented with an LCD or the like.

The barrier 122 may be implemented with a parallax barrier. In this case, the barrier may include a liquid crystal display (LCD) type barrier. The barrier may include a horizontal alternating arrangement of light-blocking portions 123 and light-transmitting portions 124. The barrier 122 may be disposed on a front face of the image panel 121. Further, the barrier 122 may operate in a normally white mode in which a liquid crystal layer blocks light when a voltage is applied to an electrode.

The user may view an image displayed on the image panel 121 through the light-transmitting portion 124 of the barrier 122. The left-eye and the right-eye may view, through the same light-transmitting portion 124, different areas in the image panel 121. That is, the left-eye and right-eye of the user may view different images displayed from the left-eye image pixel and the right-eye image pixel, respectively, through the same light-transmitting portion 124. This allows the user to experience a stereoscopic feeling.

Particularly, the 3D display method using the parallax barrier may be realized in a following manner: thin stripe-like vertical slits for transmitting or blocking light are arranged at regular intervals, and left and right images are alternately arranged at appropriate intervals in front of or behind the vertical slits. Therefore, when the left and right images are viewed through the slits at a specific point in time, the left and right images may be strictly separated in a geometrical and optical manner such that the user feels stereoscopic. In other words, a striped parallax barrier optical plate that functions as a special eyeglass may be placed in front of the monitor screen to allow the user to recognize the stereoscopic image without wearing specific glasses.

In this way, the stereoscopic scheme via the barrier control may distinguish, via the barrier 122, between screen areas in the image panel 121 as viewed by the right-eye and left-eye, thereby realizing a stereoscopic effect as a kind of optical illusion. Thus, the processor 140 may determine the position of the barrier at which the barrier 122 should be activated, based on the distance between the pair of left and right eyes of the first user and the image panel 121. That is, the processor 140 may selectively activate one or more of the plurality of alternately arranged light-blocking portions 123 based on the position of the pair of left and right eyes of the first user to provide a stereoscopic screen. Thus, according to the present disclosure, the activated light blocking portion 123 may allow the right-eye not to be able to see the screen area visible to the left-eye, while allowing the left-eye not to see the screen area that the right-eye can see. Thereby, a stereoscopic effect can be realized.

Accordingly, when two or more left and right eyes pairs are detected from the image data, the processor may detect the pair of left and right eyes of the first user among the two or more left and right eyes pairs, and may perform the barrier control based on the distance between the detected pair of left and right eyes of the first user and the image panel 121. This may provide a clear stereoscopic screen.

Figure 7:
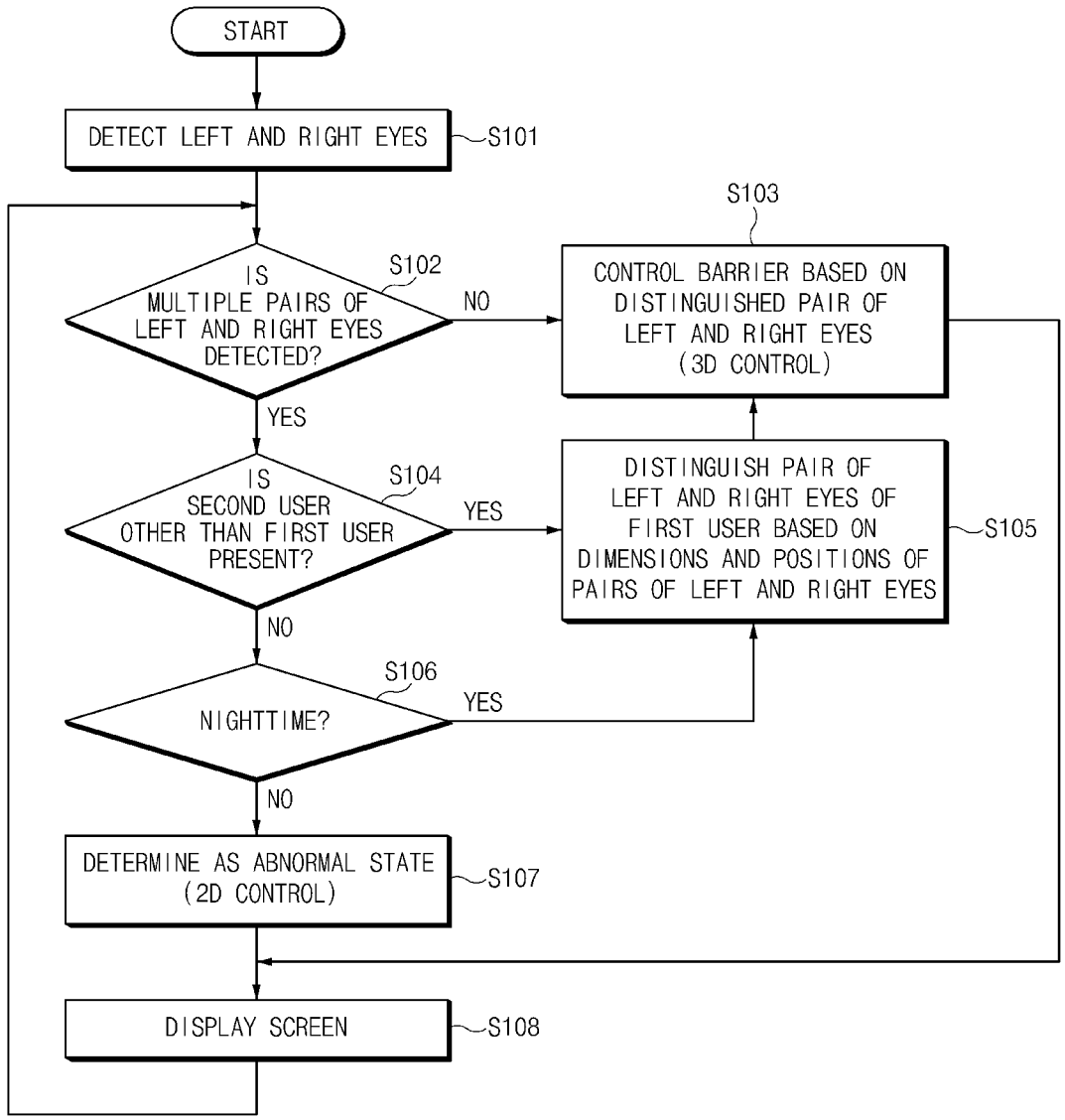
FIG. 7 is a flowchart for illustrating a method for providing a stereoscopic screen by a stereoscopic cluster for a vehicle.

Hereinafter, referring to FIG. 7, a flowchart for illustrating a method for providing the stereoscopic screen by the stereoscopic cluster in one form of the present disclosure will be illustrated. FIG. 7 is a flow chart illustrating a method for providing the stereoscopic screen by the stereoscopic cluster in another form of the present disclosure. In the following, it may be assumed that the processor 140 of the stereoscopic cluster 100 of FIG. 1 performs the process of FIG. 7.

Referring to FIG. 7, the stereoscopic cluster 100 may detect one or more pairs of left and right eyes from the image data received from the image acquisition device 200 (S101).

Then, the stereoscopic cluster 100 may determine whether the number of the detected left and right eyes pairs are plural (S102). When the number of the detected pairs is not multiple but single, the stereoscopic cluster 100 may determine that the pair of left and right eyes as detected is the pair of left and right eyes of the first user. Thus, the cluster may control the barrier based on the position of the pair of left and right eyes of the first user (S103). This allows the cluster to provide a stereoscopic screen (S108).

Conversely, when the number of the detected left and right eyes pairs are multiple, the stereoscopic cluster 100 may determine whether a passenger other than the first user is present in the vehicle (S104). In this connection, the stereoscopic cluster 100 may use the sensed result from the ultrasonic sensor 310 and the mat sensor 320 to determine whether there is a passenger other than the first user.

When there is a passenger other than the first user, the stereoscopic cluster 100 may identify the pair of left and right eyes of the first user using the positions of the left and right eyes pairs and the dimensions of the left and right eyes pairs (S105). In other words, among the left and right eyes pairs, the pair of left and right eyes having the largest distance from the stereoscopic cluster or the IR camera mounted on the stereoscopic cluster and/or having the largest dimension may be determined as the pair of left and right eyes of the first user by the stereoscopic cluster 100. Thus, the stereoscopic cluster 100 may control the barrier based on the position of the distinguished pair of left and right eyes of the first user (S103). The cluster may then provide the stereoscopic screen (S108).

In contrast, when it is determined from the determination result of operation S104 that there is no passenger other than the first user, the stereoscopic cluster 100 may determine whether the current time is nighttime (S106).

When the current time is nighttime, the stereoscopic cluster 100 may determine that the plurality of left and right eyes pairs include false left and right eyes pairs reflected on the window, in addition to the pair of left and right eyes of the first user. Thus, the stereoscopic cluster 100 may distinguish the pair of left and right eyes of the first user (S105). Then, the cluster may control the barrier based on the location of the distinguished pair of left and right eyes of the first user. Subsequently, the cluster may provide the stereoscopic screen (S108).

Conversely, when it is determined from the determination result of the operation S106 that the current time is a daytime other than a nighttime, the stereoscopic cluster 100 may determine that the current state is an abnormal state because the multiple pairs of left and right eyes have been detected even in a condition that the multiple pairs of left and right eyes cannot be normally detected. The cluster may then control the barrier to provide a 2D screen (S107). Then, the stereoscopic cluster 100 may output a 2D screen.

Figure 8:
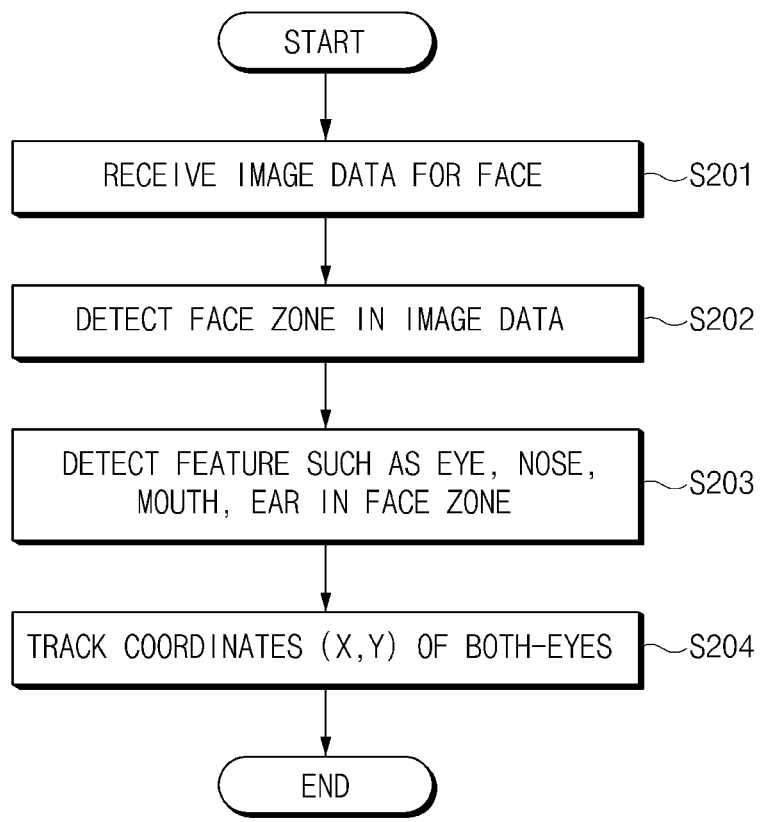
FIG. 8 is a flow chart illustrating a method for detecting left and right eyes by a stereoscopic cluster for a vehicle.

Hereinafter, referring to FIG. 8, a method for detecting the pairs of left and right eyes by the stereoscopic cluster in one form of the present disclosure will be exemplified. FIG. 8 is a flow chart illustrating a method for detecting pairs of left and right eyes by the stereoscopic cluster. In the following, it may be assumed that the processor 140 of the stereoscopic cluster 100 of FIG. 1 performs the process of FIG. 8.

The stereoscopic cluster 100 may receive the image data capturing the face from the image acquisition device 200 (S201). Then, the cluster may detect a face zone in the received image data (S202). In this connection, the method of detecting the face zone in face image data may be performed based on various conventional techniques.

Then, the stereoscopic cluster 100 may detect features such as eye, nose, mouth, and ear in the face zone (S203). The stereoscopic cluster 100 may then track the coordinates of left and right eyes among the landmarks or features, thereby acquiring the coordinates of the pairs of left and right eyes (S204).

In this way, the stereoscopic cluster 100 according to the present disclosure may distinguish only the pair of left and right eyes of the first user even when multiple pairs of left and right eyes are detected. Thus, the stereoscopic cluster 100 may control the barrier based on the distinguished pair, such that a clear stereoscopic screen may be provided for the first user.

Further, when the abnormal state is determined, the cluster may automatically switch the stereoscopic screen to a 2D screen such that the first user does not miss the cluster information to help the driver with safe driving.

Further, according to the present disclosure, utilizing the existing ultrasonic sensors, mat sensors, and auto-light sensors, and the like mounted on the vehicle may allow a clear stereoscopic screen to be realized without any additional cost increases.

Figure 9:
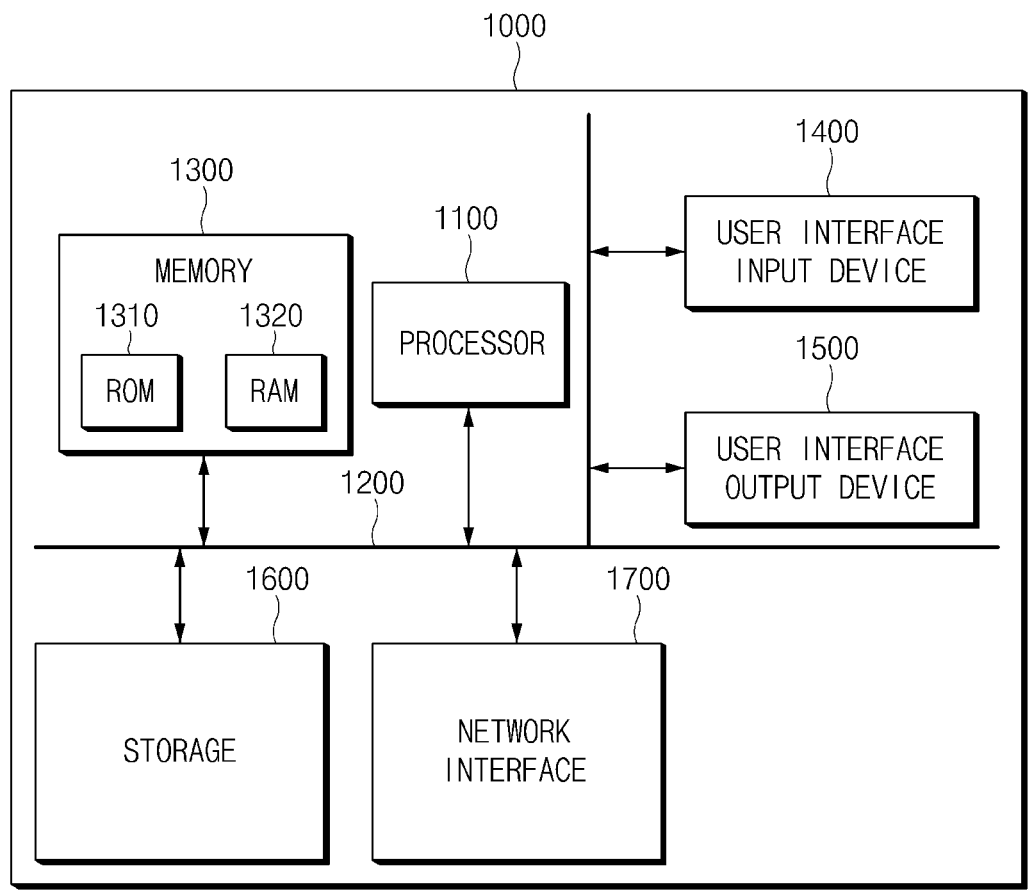
FIG. 9 shows a computing system.

FIG. 9 illustrates a computing system in one form of the present disclosure.

Referring FIG. 9, a computing system 1000 may include at least one or more processor 1100, a memory 1300, a user interface input device 1400, a user interface output device 1500, storage 1600, and a network interface 1700, which are all connected via a bus 1200.

The processor 1100 may be implemented with a semiconductor device that processes instructions stored in a central processing unit (CPU) or the memory 1300 and/or the storage 1600. The memory 1300 and the storage 1600 may include various types of volatile or nonvolatile storage media. For example, the memory 1300 may include a ROM (Read Only Memory) and a RAM (Random Access Memory).

Thus, the operations of the method or algorithm illustrated in connection with the forms disclosed herein may be embodied directly in a hardware module, a software module, or in a combination thereof, as executed by the processor 1100. The software module may reside in storage medium (that is, the memory 1300 and/or storage 1600) such as a RAM memory, a flash memory, a ROM memory, an EPROM memory, an EEPROM memory, a register, a hard disk, a removable disk, a CD-ROM, etc.

Exemplary storage media may be coupled to processor 1100. The processor 1100 may read information from the storage medium or write information to the storage medium. Alternatively, the storage medium may be integrated with the processor 1100. The processor and storage medium may reside in an application specific integrated circuit (ASIC). The ASIC may reside within the user device. Alternatively, the processor and storage medium may reside as discrete components in a user terminal.

In one form of the present disclosure, the stereoscopic cluster for the vehicle may distinguish only the both-eyes of the driver in detection of multiple pairs of left and right eyes in the vehicle, thereby providing the driver with a clear stereoscopic screen to enhance the driver's convenience.

In addition, various effects may be provided that are directly or indirectly identified herein.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Accordingly, the forms disclosed in the present disclosure are intended to illustrate rather than to limit the technical spirit of the present disclosure. Those forms may not limit the range of the spirit of the present disclosure. The scope of protection of the present disclosure is to be construed in accordance with the following claims, and all technical spirits within the scope of the claims shall be construed as being included in the scope of the present disclosure.

What is claimed is:

1. A stereoscopic cluster for a vehicle, the stereoscopic cluster comprising:
 a processor configured to:
  detect at least one pair of left and right eyes from acquired image data;
  when at least two pairs of left and right eyes including a false pair of left and right eyes of a first user reflected on a window of the vehicle are detected, distinguish a true pair of left and right eyes of the first user among the at least two pairs of left and right eyes; and provide a stereoscopic screen based on the distinguished true pair of left and right eyes of the first user; and
a display controlled by the processor to display the stereoscopic screen.

2. The stereoscopic cluster of claim 1, wherein the processor is configured to:
determine presence or absence of a second user other than the first user in the vehicle;
when the second user is present, detect a pair of left and right eyes of the second user; and
distinguish the true pair of left and right eyes of the first user among the at least three pairs of left and right eyes.

3. The stereoscopic cluster of claim 2, wherein the processor is configured to determine whether the second user is present in the vehicle based on a received sensed value from an ultrasonic sensor configured to sense movement within the vehicle, or from a mat sensor configured to sense whether a corresponding seat is seated.

4. The stereoscopic cluster of claim 2, wherein the processor is configured to:
when the at least three pairs of left and right eyes are detected, and the second user other than the first user is present, distinguish the true pair of left and right eyes of the first user based on a dimension of each of the at least three pairs of left and right eyes, and based on a distance between each of the at least three pairs of left and right eyes and the stereoscopic cluster.

5. The stereoscopic cluster of claim 2, wherein the processor is configured to determine whether a current time is nighttime
when the at least two pairs of left and right eyes are detected and the second user other than the first user is absent.

6. The stereoscopic cluster of claim 5, wherein the processor is configured to:
when the at least two pairs of left and right eyes are detected, the second user other than the first user is absent, and the current time is the nighttime,
distinguish the true pair of left and right eyes of the first user based on a dimension of each of the at least two pairs of left and right eyes, and based on a distance between each of the at least two pairs of left and right eyes and the stereoscopic cluster.

7. The stereoscopic cluster of claim 5, wherein the processor is configured to determine a current state as an abnormal state
when the at least two pairs of left and right eyes are detected, the second user other than the first user is absent, and the current time is daytime.

8. The stereoscopic cluster of claim 7, wherein the processor is configured to control the display to provide a two-dimensional (2D) screen thereon
when the current state is determined as the abnormal state.

9. The stereoscopic cluster of claim 8, wherein the processor is configured to:
when determined that the abnormal state returns to a normal state while the 2D screen is being presented, provide a pop-up on the display such that the first user selects whether to change the 2D screen to the stereoscopic screen.

10. The stereoscopic cluster of claim 5, wherein the processor is configured to
determine whether the current time is the nighttime based on at least one of information received from an auto-light sensor or information received from a navigation device.

11. The stereoscopic cluster of claim 1, wherein the processor is configured to:
detect a face zone of the first user;
detect features in the detected face zone; and
track coordinates of left-right eyes among the features.

12. The stereoscopic cluster of claim 1, wherein the display includes:
an image panel including a right-eye image pixel for providing a right image for a right-eye, and a left-eye image pixel for providing a left image for a left-eye; and
a barrier disposed on a front face of the image panel, wherein the barrier is controlled by the processor.

13. The stereoscopic cluster of claim 12, wherein the processor is configured to control the barrier based on a position of the true pair of left and right eyes of the first user.

14. A system comprising:
a passenger detection device configured to detect presence or absence of a passenger in a vehicle; and
a stereoscopic cluster for the vehicle, wherein the cluster is configured to:
detect at least one pair of left and right eyes from acquired image data;
when at least two pairs of left and right eyes including a false pair of left and right eyes of a first user reflected on a window of the vehicle are detected, distinguish a true pair of left and right eyes of the first user among the at least two pairs of left and right eyes; and
provide a stereoscopic screen based on the distinguished true pair of left and right eyes of the first user.

15. A method for providing a stereoscopic screen, the method comprising:
detecting, by a processor, at least one pair of left and right eyes from acquired image data;
when at least two pairs of left and right eyes including a false pair of left and right eyes of a first user reflected on a window of the vehicle are detected, distinguishing, by the processor, a true pair of left and right eyes of the first user among the at least two pairs of left and right eyes; and
providing, by the processor, a stereoscopic screen based on the distinguished true pair of left and right eyes of the first user.

16. The method of claim 15, wherein distinguishing the true pair of left and right eyes of the first user includes:
when a number of the detected pairs of left and right eyes in the vehicle is at least three, determining presence or absence of a second user other than the first user in the vehicle; and
when the second user is present, distinguishing the true pair of left and right eyes of the first user based on a dimension of each of the at least three pairs of left and right eyes, and based on a distance between each of the at least three pairs of left and right eyes and a stereoscopic cluster.

17. The method of claim 15, wherein distinguishing the true pair of left and right eyes of the first user further includes:
when a second user other than the first user is absent in the vehicle, determining whether current time is nighttime; and
when the current time is the nighttime, distinguishing the true pair of left and right eyes of the first user based on the dimension of each of the at least two pairs of left and right eyes, and based on the distance between each of the at least two pairs of left and right eyes and the stereoscopic cluster.

18. The method of claim 17, wherein distinguishing the true pair of left and right eyes of the first user further includes:
   when the current time is daytime, determining a current state as an abnormal state; and
   providing a two-dimensional (2D) screen for the first user.

19. The method of claim 18, further comprising:
   continuously determining, by the processor, whether the second user is present in the vehicle and determining the current time while the 2D screen is being presented; and
   when the continuously determining the current time determines that the abnormal state returns to a normal state, providing a pop-up for changing the 2D screen to a stereoscopic screen.

20. The method of claim 16, wherein the determining the presence or absence of the second user includes:
   determining whether the second user other than the first user is present in the vehicle based on a received sensed value from an ultrasonic sensor for sensing movement within the vehicle, or from a mat sensor for sensing whether a corresponding seat is seated,
   wherein the providing the stereoscopic screen includes controlling a barrier based on a position of the true pair of left and right eyes of the first user.

* * * * *